(12) United States Patent
Takai et al.

(10) Patent No.: US 11,684,034 B2
(45) Date of Patent: Jun. 27, 2023

(54) ANIMAL LITTER BOX

(71) Applicant: UNICHARM CORPORATION, Shikokuchuo (JP)

(72) Inventors: Chiyo Takai, Kagawa (JP); Shinya Kaneko, Kagawa (JP); Yuki Koido, Kagawa (JP)

(73) Assignee: UNICHARM CORPORATION, Ehime (JP)

( * ) Notice: Subject to any disclaimer, the term of this patent is extended or adjusted under 35 U.S.C. 154(b) by 44 days.

(21) Appl. No.: 16/977,471

(22) PCT Filed: Feb. 13, 2019

(86) PCT No.: PCT/JP2019/005031
§ 371 (c)(1),
(2) Date: Sep. 2, 2020

(87) PCT Pub. No.: WO2019/171893
PCT Pub. Date: Sep. 12, 2019

(65) Prior Publication Data
US 2021/0045348 A1    Feb. 18, 2021

(30) Foreign Application Priority Data
Mar. 8, 2018   (JP) .............................. JP2018-042038

(51) Int. Cl.
*A01K 1/01*   (2006.01)
(52) U.S. Cl.
CPC .................................. *A01K 1/0114* (2013.01)
(58) Field of Classification Search
CPC .................................................. A01K 1/0114
See application file for complete search history.

(56) References Cited

U.S. PATENT DOCUMENTS 5,797,346 A     8/1998  Lewis
6,408,790 B1 *  6/2002  Maguire .............. A01K 1/0114
                                                  119/165

(Continued)

FOREIGN PATENT DOCUMENTS

AU     2015384982 A1 *  8/2017 ............... A01K 1/01
CN        1891036 A     1/2007

(Continued)

OTHER PUBLICATIONS

International Search Report in PCT Application No. PCT/JP2019/005031, dated May 14, 2019, 4pp.

(Continued)

*Primary Examiner* — Joshua D Huson
*Assistant Examiner* — Alanna K Peterson
(74) *Attorney, Agent, or Firm* — Hauptman Ham, LLP

(57) ABSTRACT

An animal litter box includes: a tray housing including a urine passage portion and an insertion opening; and a tray including an absorbent-body placement surface. The urine passage portion has holes through which urine pass downward. The insertion opening is formed in a front surface of the tray housing. On the absorbent-body placement surface, an absorbent body for absorbing urine that has passed through the holes is placed. The tray is housed in the tray housing from the insertion opening in such a way that the tray is capable of being pulled out forward. The tray is capable of being housed in the tray housing with an orientation of the tray in the front-back direction reversed. The tray includes an identification portion in a part of the tray other than the absorbent-body placement surface, and the identification portion is for identifying one side and another side in the front-back direction.

16 Claims, 11 Drawing Sheets

(56) References Cited

U.S. PATENT DOCUMENTS

| | | | | |
|---|---|---|---|---|
| 6,523,495 | B1* | 2/2003 | Rydman | A01K 1/0107 119/167 |
| 9,737,045 | B1* | 8/2017 | Scanlan | A01K 1/0157 |
| 2006/0288948 | A1* | 12/2006 | Ikegami | A01K 1/0107 119/167 |
| 2011/0239955 | A1* | 10/2011 | Miller | A01K 1/0107 119/673 |
| 2014/0150727 | A1* | 6/2014 | Matsuo | A01K 1/0107 119/169 |
| 2015/0075439 | A1* | 3/2015 | Sogou | A01K 1/0155 119/172 |
| 2015/0164040 | A1* | 6/2015 | Anderson | A01K 1/0125 119/168 |
| 2016/0219828 | A1* | 8/2016 | Goerz | A01K 1/011 |
| 2017/0027110 | A1* | 2/2017 | Ito | A01G 7/045 |
| 2017/0367294 | A1* | 12/2017 | Takagi | A01K 23/00 |

FOREIGN PATENT DOCUMENTS

| | | |
|---|---|---|
| CN | 104039128 A | 9/2014 |
| CN | 206273697 U | 6/2017 |
| CN | 107205360 A | 9/2017 |
| JP | 2004313114 A | 11/2004 |
| JP | 2004344088 A | 12/2004 |
| JP | 2007124 A | 1/2007 |
| JP | 4447517 B2 | 4/2010 |
| WO | 2016139817 A1 | 9/2016 |
| WO | 2016140030 A1 | 9/2016 |
| WO | WO-2016164868 A1 * | 10/2016 ........... A01K 1/0107 |
| WO | WO-2017008168 A1 * | 1/2017 ........... A01K 1/0107 |

OTHER PUBLICATIONS

Written opinion in PCT Application No. PCT/JP2019/005031, dated May 14, 2019, 3pp.
Office Action in EP Application No. 19764508.8, dated Apr. 21, 2021, 7pp.
Office Action in CN application No. 201980017508.3, dated Dec. 17, 2021, 18pp.
Written opinion in PCT Application No. PCT/JP2019/005031, dated May 14, 2019, 9pp.
Wu Zhijun, "Science of Chinese Kitchen Design", Aug. 2017, pp. 60-61, Hunan University Press, 5pp.
Office Action in CN application No. 201980017508.3 dated Jul. 28, 2022, 14pp.

* cited by examiner

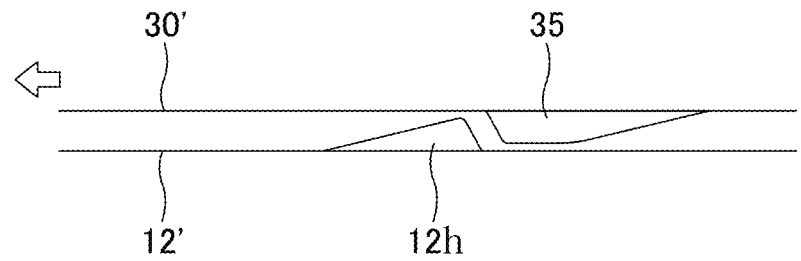
FIG. 11A
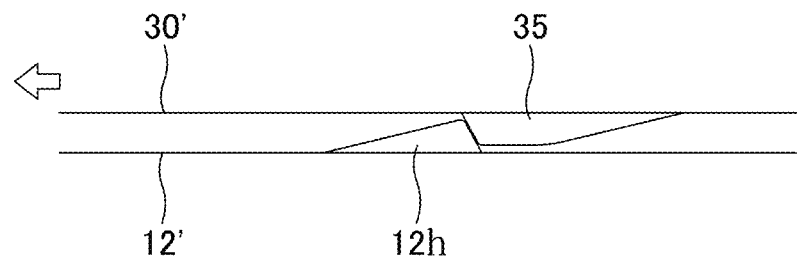
FIG. 11B
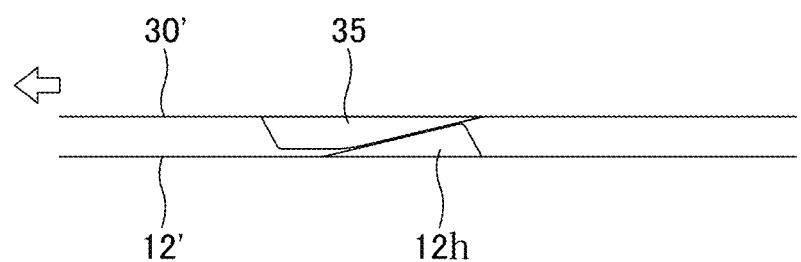
FIG. 11C
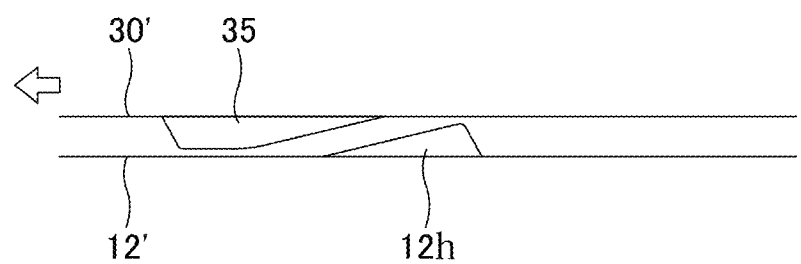
FIG. 11D
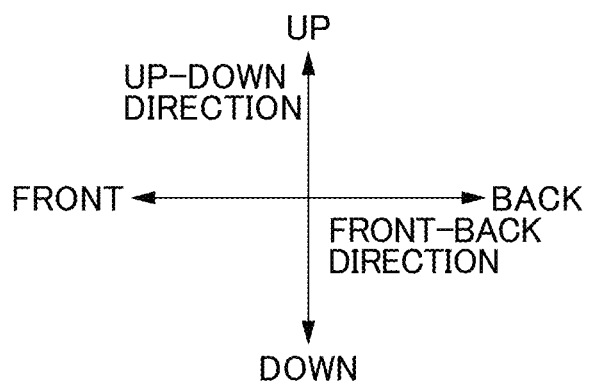

ANIMAL LITTER BOX

RELATED APPLICATIONS

The present application is a National Phase of International Application No. PCT/JP2019/005031, filed Feb. 13, 2019, and claims priority based on Japanese Patent Application No. 2018-042038, filed Mar. 8, 2018.

TECHNICAL FIELD

The present invention relates to an animal litter box.

BACKGROUND ART

There is a known animal litter box, used for an animal such as a cat, in which a pull-out tray that holds an absorbent body for absorbing urine is disposed below a urine passage portion having a plurality of holes, so that the absorbent body can absorb urine that has passed through the urine passage portion.

In general, because an animal such as a cat has a habit of excreting at a fixed position, urine is usually absorbed at the same position in the absorbent body. Therefore, urine is usually absorbed by the same part of the absorbent body, and urine tends to be absorbed in a biased manner. For this reason, for example, Patent Document 1 discloses an animal litter box having a tray that is reversible in the front-back direction.

CITATION LIST

Patent Literature

[Patent Document 1] Japanese Patent Application Publication No. 2007-124

SUMMARY OF INVENTION

Technical Problem

However, in the animal litter box described above, because the front and back of the tray have the same shape, it may be difficult for a user to recognize the timing at which the front and back of the tray are to be reversed or to recognize the timing at which the absorbent body is to be replaced. As a result, the user may unnecessarily reverse or replace the tray, or urine may leak or smell due to delay in replacement.

The present invention has been made to solve the above problems, and an object thereof is to provide an animal litter box that allows a user to easily recognize whether it is necessary to reverse a tray or to replace an absorbent body.

Solution to Problem

A main aspect of the present invention for achieving the above-described aspect is An animal litter box having a front-back direction, a left-right direction, and an up-down direction that are orthogonal to each other,
the animal litter box including:
a tray housing including a urine passage portion and an insertion opening,
the urine passage portion having a plurality of holes through which urine pass downward,
the insertion opening that is formed in a front surface of the tray housing; and
a tray including an absorbent-body placement surface on which an absorbent body for absorbing urine that has passed through the holes is placed,
the tray being housed in the tray housing from the insertion opening in such a way that the tray is capable of being pulled out forward,
the tray being capable of being housed in the tray housing with an orientation of the tray in the front-back direction reversed,
the tray including an identification portion in a part of the tray other than the absorbent-body placement surface,
the identification portion being for identifying one side and an other side in the front-back direction.

Features of the present invention other than the above will become clear by reading the description of the present specification with reference to the accompanying drawings.

Advantageous Effects of Invention

With the present invention, it is possible to provide an animal litter box that allows a user to easily recognize whether it is necessary to reverse a tray or to replace an absorbent body.

BRIEF DESCRIPTION OF THE DRAWINGS

FIGS. 11A to 11D are schematic sectional views illustrating an identification operation.

DESCRIPTION OF EMBODIMENTS

Figure 1:
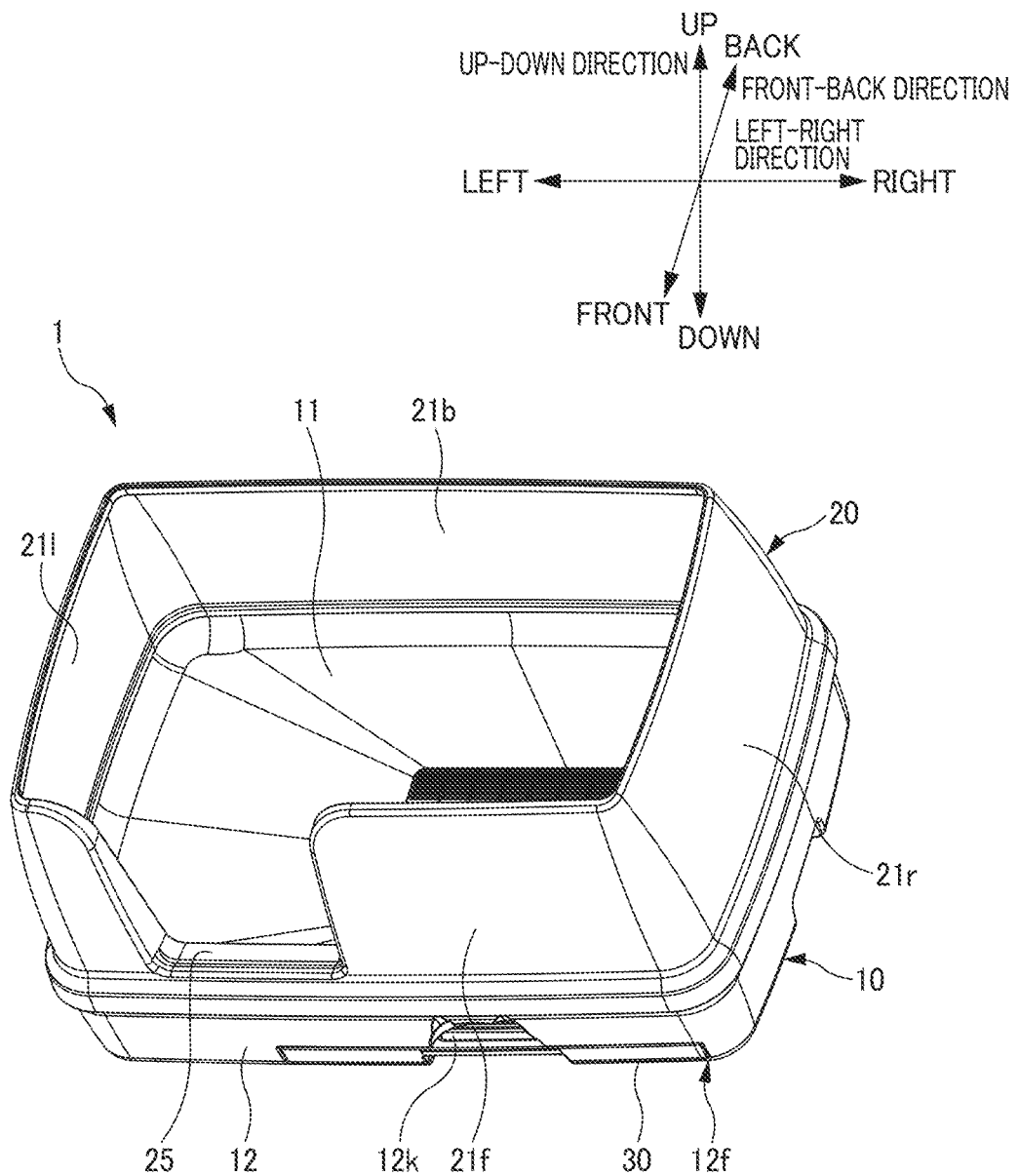
FIG. 1 is a schematic perspective view of an animal litter box 1.

At least the following matters will become clear with the description of this specification and the attached drawings.

An animal litter box having a front-back direction, a left-right direction, and an up-down direction that are orthogonal to each other,
the animal litter box including:
a tray housing including a urine passage portion and an insertion opening,
the urine passage portion having a plurality of holes through which urine pass downward,
the insertion opening that is formed in a front surface of the tray housing; and a tray including an absorbent-body placement surface on which an absorbent body for absorbing urine that has passed through the holes is placed, the tray being housed in the tray housing from the insertion opening in such a way that the tray is capable of being pulled out forward, the tray being capable of being housed in the tray housing with an orientation of the tray in the front-back direction reversed, the tray including an identification portion in a part of the tray other than the absorbent-body placement surface, the identification portion being for identifying one side and an other side in the front-back direction.

With such an animal litter box, a user can easily identify the front and back of the tray, and therefore the user can easily recognize whether it is necessary to reverse the tray or to replace the absorbent body. Thus, it is possible to suppress unnecessary reversing and replacement of the absorbent body and to suppress occurrence of leakage of urine or generation of smell due to delay in replacement.

In such an animal litter box, it is acceptable that
the identification portion is disposed at a position that is not visible from outside in a state where the tray is housed in the tray housing.

With such an animal litter box, because the identification portion is not visible from the outside, the identification portion does not affect the appearance.

In such an animal litter box, it is acceptable that
the identification portion is disposed on an upper surface of the tray.

With such an animal litter box, the visibility of the identification portion can be increased.

In such an animal litter box, it is desirable that
the identification portion is disposed within an area of the tray in the left-right direction,
the area corresponding to a width of the urine passage portion in the left-right direction.

With such an animal litter box, for example, by pulling out the tray slightly, a user can check the identification portion through the holes in the urine passage portion.

In such an animal litter box, it is desirable
that the tray has end regions on both sides in the front-back direction between which the absorbent-body placement surface is interposed,
each of the end regions including a handle, and
that the identification portion is disposed in each of the end regions.

With such an animal litter box, a user can quickly notice the identification portion when pulling out the tray.

In such an animal litter box, it is desirable that
the identification portion is disposed between the handle and the absorbent-body placement surface.

With such an animal litter box, a user can easily notice the identification portion because the identification portion is not hidden when the user grasps the handle. When pulling out the tray, the user can identify the orientation of the tray before the absorbent body becomes exposed.

In such an animal litter box, it is desirable
that the identification portion is a protruding portion, and
that a protruding height of the identification portion is smaller than or equal to a height of the handle.

With such an animal litter box, the identification portion does not cause obstruction when a user stores (inserts) or pulls out the tray.

In such an animal litter box, it is desirable that
a portion having a height smaller than a height of the handle and a height of the identification portion is present between the handle and the identification portion.

With such an animal litter box, the identification portion can be made conspicuous.

In such an animal litter box, it is desirable
that an overhead portion that is directly above the insertion opening of the tray housing is recessed backward, and
that the identification portion passes below the overhead portion when the tray is being pulled out.

With such an animal litter box, a user can more quickly notice the identification portion.

In such an animal litter box, it is desirable that
an external shape of the overhead portion when seen from front is similar to an external shape of the identification portion.

With such an animal litter box, a user can easily and correctly perform identification.

In such an animal litter box, it is desirable
that the tray includes
a first identification portion on the one side in the front-back direction and
a second identification portion on the other side in the front-back direction,
the second identification portion being different from the first identification portion,
that the tray housing includes a housing-side identification portion on the front surface, and
that similarity between the housing-side identification portion and either one of the first identification portion and the second identification portion is higher than similarity between the housing-side identification portion and other one of the first identification portion and the second identification portion.

With such an animal litter box, a user can easily identify the orientation of the tray.

In such an animal litter box, it is desirable
that the first identification portion has a shape that represents a part of an upper body of an animal, and
that the second identification portion has a shape that represents a part of a lower body of the animal, and
that the housing-side identification portion has a shape that represents the part of either one of the upper body and the part of the lower body.

With such an animal litter box, it can make more noticeable the orientation of the tray.

In such an animal litter box, it is desirable
that the animal litter box comprises an access opening for an animal, in the front surface above the urine passage portion,
that the access opening is disposed so as to be displaced toward one side in the left-right direction relative to a left-right-direction central position of the tray housing,
that the insertion opening is disposed so as to be displaced toward another side in the left-right direction relative to the left-right-direction central position, and
that the identification portion does not overlap the access opening in the left-right direction.

With such an animal litter box, even if an animal tries to enter the animal litter box through the access opening when a user is pulling out the tray, the field of vision of the user is not obstructed by the animal.

In such an animal litter box, it is desirable
that the tray includes a pair of storing portions on both sides in the left-right direction, the storing portions being recessed downward, and
that the identification portion is disposed at a position that is between the pair of storing portions and that is higher than bottom surfaces of the pair of storing portions.

With such an animal litter box, the identification portion is conspicuous.

In such an animal litter box, it is desirable
that the identification portion is either one of a protruding portion or a recessed portion, and
that the identification portion is formed on or in a lower surface of the tray.

With such an animal litter box, the identification portion does not affect the appearance of the tray, and a user can identify the orientation of the tray by touching the identification portion.

In such an animal litter box, it is desirable
that a projection that projects upward is formed on a surface of the tray housing facing the lower surface of the tray,
that the identification portion is the protruding portion, the protruding portion colliding with the projection when the tray is being pulled out,
that the identification portion is disposed on each of the front-back-direction one side and the front-back-direction other side of the lower surface, and
that a number of the protruding portion on the front-back-direction one side differ from a number of the protruding portion on the front-back-direction other side.

With such an animal litter box, a user can identify the orientation of the tray from the number of sounds generated and the tactile sensation transmitted to the hand when the user pulls out the tray.

In such an animal litter box, it is desirable that
the identification portion is disposed at a position that is visible from outside in a state where the tray is housed in the tray housing.

With such an animal litter box, a user can identify the orientation of the tray without pulling out the tray.

In such an animal litter box, it is desirable
that the tray includes a handle at each end in the front-back direction, and
that the identification portion is formed in the handle.

With such an animal litter box, a user can easily notice the identification portion when the user tries to grasp the handle and can identify the orientation without pulling out the tray.

First Embodiment

Overall Configuration

Figure 2:
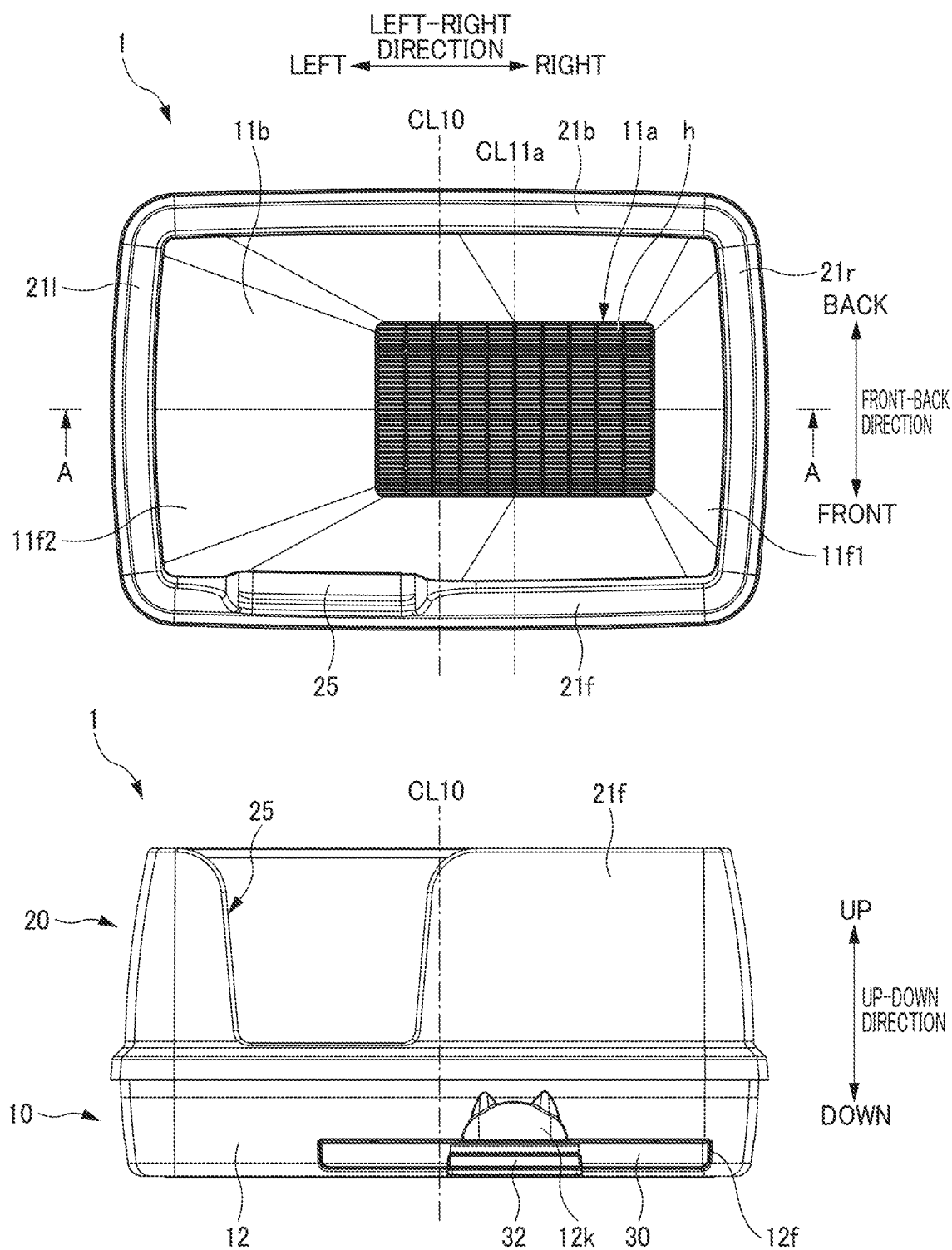
FIG. 2 illustrates the animal litter box 1 as seen from above in the up-down direction and from the front in the front-back direction.
Figure 3:
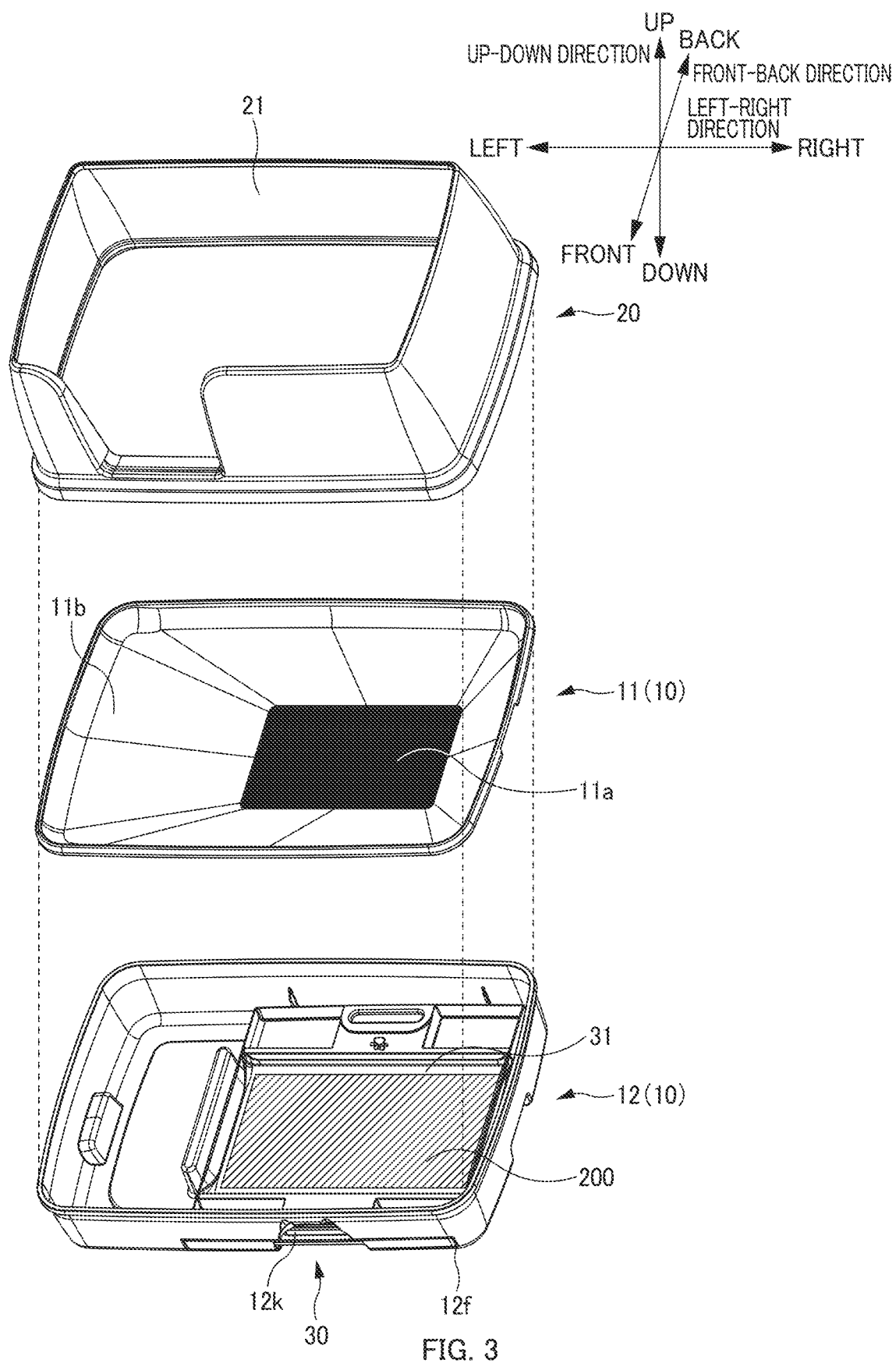
FIG. 3 is an exploded perspective view of the animal litter box 1.
Figure 4:
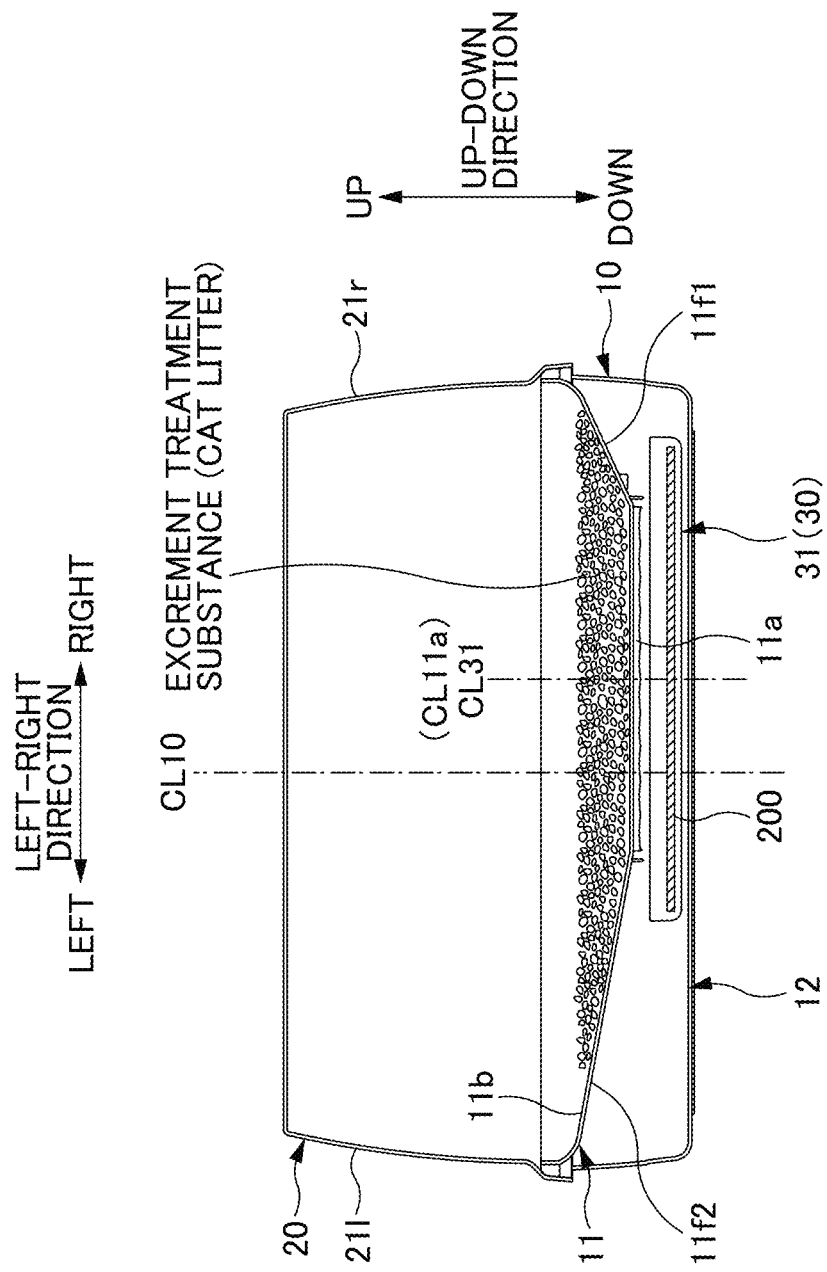
FIG. 4 is a sectional view taken along line A-A in FIG. 2.

An animal litter box 1 will be described as an example of an animal litter box according to the present embodiment. FIG. 1 is a schematic perspective view of the animal litter box 1. FIG. 2 illustrates the animal litter box 1 as seen from above in the up-down direction and from the front in the front-back direction. FIG. 3 is an exploded perspective view of the animal litter box 1. FIG. 4 is a sectional view taken along line A-A in FIG. 2. In the following description, as illustrated in FIG. 1, three directions that are orthogonal to each other are defined as the "left-right direction", the "front-back direction", and the "up-down direction". The "left-right direction" is the longitudinal direction of the animal litter box 1, and the side on which a cutout 25 is formed with respect to a central position CL10 of the animal litter box 1 in the longitudinal direction is defined as "left", and the opposite side is defined as "right". The "front-back direction" is the transversal direction of the animal litter box 1, and the direction in which a tray 30 is pulled out from a main body 10 is defined as "front", and the opposite direction is defined as "back". The "up-down direction" is the vertical direction, and upward in the vertical direction is defined as "upper", and downward is defined as "lower".

The animal litter box 1 includes the main body 10 (corresponding to a tray housing) for receiving excrement of an animal, a cover 20 that is removably attached to the upper side of the main body 10, and the tray 30 that is housed in the main body 10.

The main body 10 includes an upper case 11 and a lower case 12. The upper case 11 is a box-shaped member having an upper opening, and an animal such as a cat excretes in a state in which the animal is on a bottom surface 11b of the upper case 11. When seen from above, the upper case 11 (the main body 10) according to the present embodiment is shaped like a rectangle as illustrated in FIG. 2, and the length of the upper case 11 in the left-right direction is larger than that in the front-back direction. That is, the long sides of the rectangle extend in the left-right direction, and the short sides of the rectangle extend in the front-back direction. However, the shape of the upper case 11 (the main body 10) is not limited to a rectangle, and may be, for example, an ellipse, a polygon, or the like.

As illustrated in FIG. 4, the bottom surface 11b of the upper case 11 includes inclined portions 11f1 and 11f2 that are inclined in a funnel-like shape from the outside toward the inside in the left-right direction (toward the center). At the bottom located at the lowest position in the up-down direction, a urine passage portion 11a, which allows excrement such as urine excreted by an animal to pass from the upper side toward the lower side in the height direction, is formed. The urine passage portion 11a has a plurality of holes h extending therethrough in the up-down direction. Excrement (urine) of an animal passes through the holes h and moves from the upper side to the lower side of the upper case 11 (toward the lower case 12). In the present embodiment, the urine passage portion 11a is offset rightward in the left-right direction. That is, a central position CL11a (see FIG. 2) of the urine passage portion 11a in the left-right direction is disposed so as to be displaced rightward relative to the central position CL10 of the main body 10 in the left-right direction.

When the animal litter box 1 is in use, an excrement treatment substance, which is a granular material such as cat litter, is placed on the upper surface of the urine passage portion 11a (see FIG. 4 and others), and an animal such as a cat excretes onto the excrement treatment substance. The excrement treatment substance used for the animal litter box 1 is a granular material having a porous structure, such as zeolite or silica gel. Upon contact with urine or the like excreted by an animal, the excrement treatment substance has a deodorizing effect by absorbing an ammonia component and an effect of removing moisture. In order to suppress the granules of the excrement treatment substance from falling through the holes h of the urine passage portion 11a, the holes h of the urine passage portion 11a preferably have a shape and a size that do not allow the excrement treatment substance to pass therethrough while allowing urine to pass therethrough. For example, in the animal litter box 1 according to the present embodiment, as illustrated in FIG. 2, the urine passage portion 11a is formed of a plurality of holes h each having a slit-like shape that is elongated in the left-right direction. The shape of the holes h is not limited to this, and may be, for example, an ellipse, a polygon, or the like.

The lower case 12, which is a box-shaped member having an upper opening, is placed below and attached to the upper case 11 (see FIG. 3). An insertion opening 12f, for inserting the tray 30, is formed in the front surface of the lower case 12. A recessed portion 12K (corresponding to an overhead portion and a housing-side identification portion), which is recessed backward, is formed directly above the insertion opening 12f of the lower case 12. As illustrated in FIG. 2, the recessed portion 12K according to the present embodiment is shaped like the head of a cat when seen from the front. The function of the recessed portion 12K will be described below.

The cover 20 has a wall 21 that surrounds four sides in the left-right direction and the front-back direction. To be specific, the cover 20 has a front wall portion 21f and a back wall portion 21b, which extend in the left-right direction and form the long sides of a rectangle, and a right wall portion 21r and a left wall portion 21l on the left side, which extend in the front-back direction and form the short sides of the rectangle. When the cover 20 is attached to an upper part of the main body 10 as illustrated in FIG. 1, these wall portions of the wall 21 stand upward from the periphery of the bottom surface 11b of the upper case 11, so that the four sides of the animal litter box 1 are surrounded by the wall 21.

In the present embodiment, the cutout 25 (corresponding to an access opening) is formed in a part of the front wall portion 21f, so that an animal such as a cat can enter or exit the animal litter box 1 through the cutout 25.

The tray 30 is a shallow flat box-shaped case in which an absorbent sheet (for example, an absorbent body 200 described below), which absorbs excreted urine or the like, is placed. The tray 30 is housed in the lower case 12 (the main body 10) from the insertion opening 12f of the lower case 12 in such a way that the tray 30 can be pulled out forward. In the present embodiment, the tray 30 has a rectangular shape, and is capable of being housed in the lower case 12 (the main body 10) with the orientation thereof in the front-back direction reversed. The configuration of the tray 30 according to the present embodiment will be described below.

Figure 5:
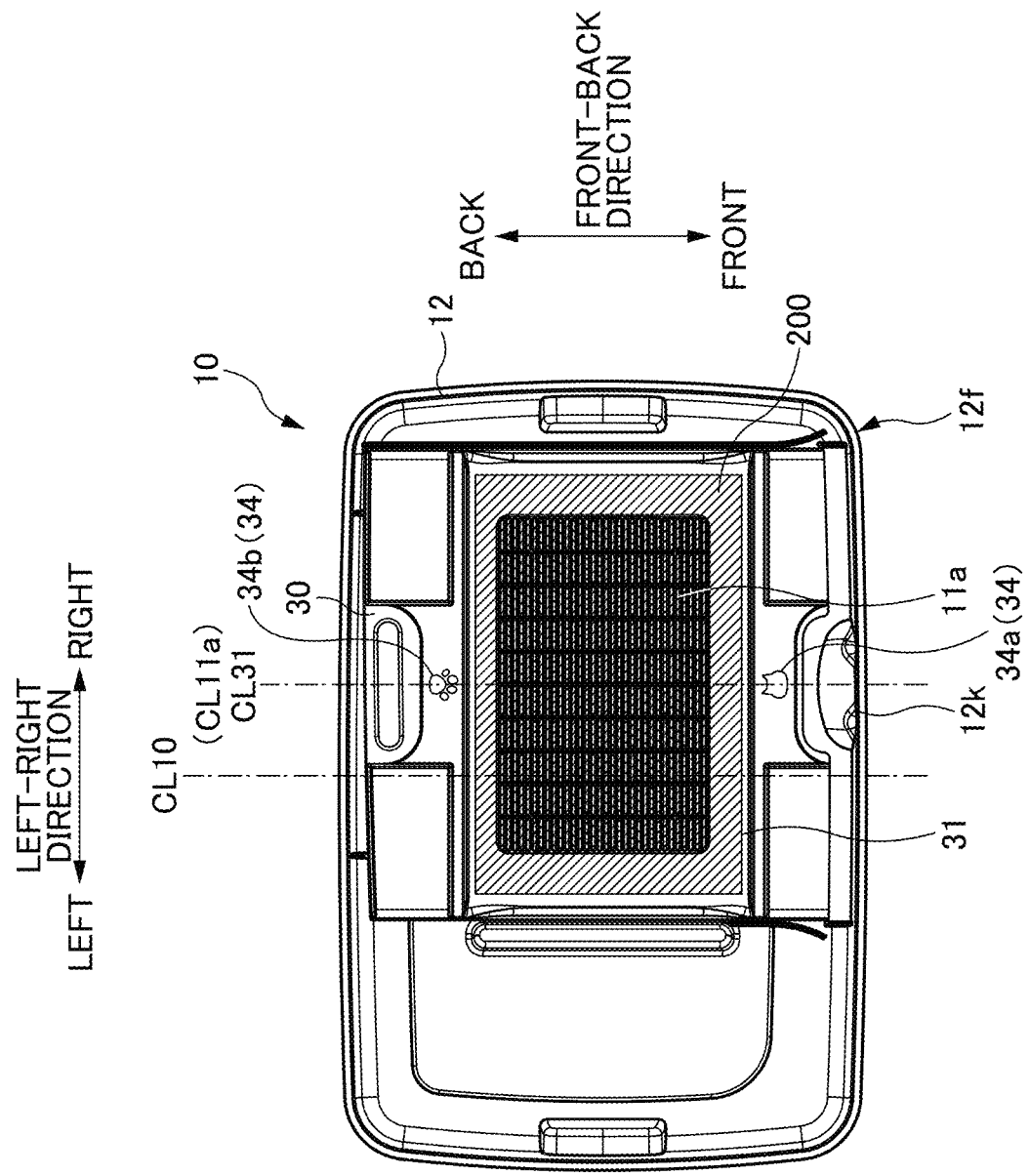
FIG. 5 is a plan view illustrating the arrangement of a lower case 12 and a tray 30.

FIG. 5 is a plan view illustrating the arrangement of the lower case 12 and the tray 30. FIG. 5 illustrates a state in which the tray 30 is housed in the lower case 12, as seen from above. Hereafter, for convenience of description, the orientation of the tray 30 when the tray 30 is housed in the lower case 12 as illustrated in FIG. 5 (that is, the orientation of the tray 30 when the tray 30 is housed so that an identification mark 34a described below is on the front side) will be referred to as the "forward orientation". The opposite orientation (the orientation when the tray 30 is housed so that an identification mark 34b is on the front side) will be referred to as the "backward orientation".

In FIG. 5, for convenience of description, the position of the urine passage portion 11a when superposed on the upper case 11 is illustrated. The insertion opening 12f (in other words, the tray 30) according to the present embodiment is offset rightward in the left-right direction.

The absorbent body 200 placed on the tray 30 is a liquid-absorbent sheet member that absorbs urine excreted by an animal such as a cat, and is made of a liquid-absorbent material such as pulp fiber, high-absorbent polymer, or the like. The absorbent body 200 may include deodorant microcapsules and an antibacterial agent so as to suppress emanation of smell of absorbed urine and reproduction of bacteria. In FIG. 5, the absorbent body 200 is shown by hatching. When the animal litter box 1 is in use, in a state in which the absorbent body 200 is disposed on an absorbent-body placement surface 31 (described below) as illustrated in FIG. 5, a central position of the absorbent body 200 in the left-right direction and a central position CL31 of the absorbent-body placement surface 31 in the left-right direction are substantially the same. That is, the absorbent body 200 is disposed directly below the urine passage portion 11a.

In the animal litter box 1 configured as described above, urine excreted by an animal such as a cat passes through the urine passage portion 11a and moves downward (falls), and is absorbed by the absorbent body 200.

In general, when an animal such as a cat excretes in the animal litter box 1, the animal has a habit of excreting at a fixed position every time. Therefore, urine is usually absorbed by the same part of the absorbent body 200, and urine tends to be absorbed in a biased manner. For this reason, in the animal litter box 1 according to the present embodiment, the orientation of the tray 30 in the front-back direction is reversible, so that a user can change the orientation of the tray 30 (in other words, the orientation of the absorbent body 200) or replace the absorbent body 200 at an appropriate timing.

However, if the shape of the tray 30 were exactly the same in the front-back direction, a user may not be able to discriminate between the front and back and may find it difficult to recognize the timing at which the tray 30 is to be reversed or the timing at which the absorbent body 200 is to be replaced. As a result, the user might perform unnecessary reversing or replacement, or a delay in replacement might cause leakage of urine or generation of smell.

Therefore, the animal litter box 1 according to the present embodiment allows a user to easily identify the orientation of the tray 30 in the front-back direction.

Configuration of Tray 30

Figure 6:
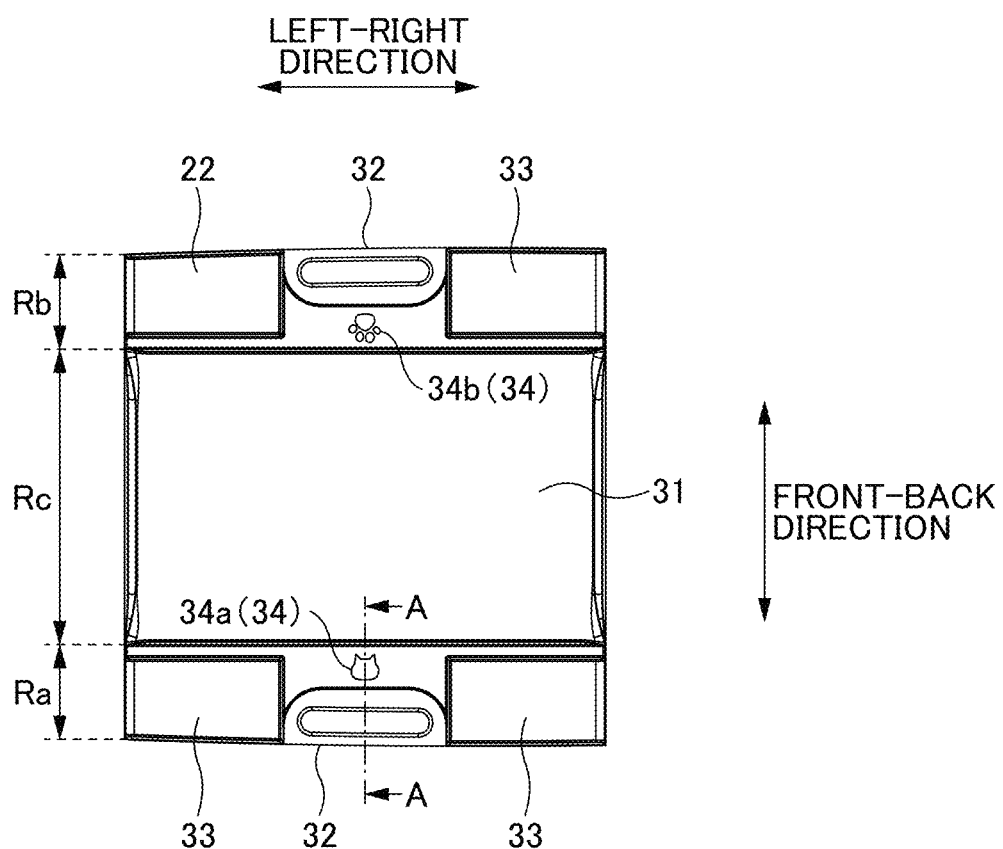
FIG. 6 is a plan view illustrating the tray 30 according to a first embodiment as seen from above.
Figure 7:
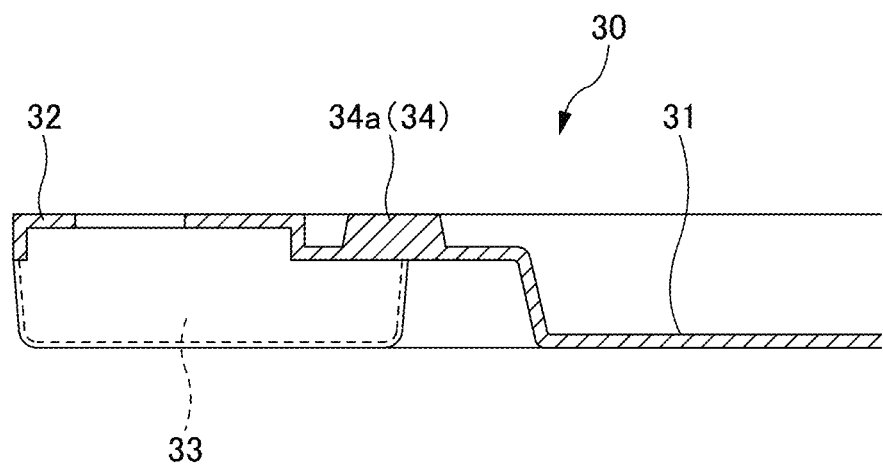
FIG. 7 is a sectional view taken along line A-A in FIG. 6.

FIG. 6 is a plan view of the tray 30 according to a first embodiment as seen from above. FIG. 7 is a sectional view taken along line A-A in FIG. 6. Hereafter, referring also to FIGS. 4 and 5, the configuration of the tray 30 will be described.

The tray 30 according to the present embodiment has a central region Rc, a first end region Ra, and a second end region Rb.

The central region Rc is a region at the center of the tray 30 in the front-back direction and has the absorbent-body placement surface 31.

The absorbent-body placement surface 31 is the upper surface of a portion on which the absorbent body 200 is disposed. As illustrated in FIG. 5, in a state in which the tray 30 is housed, the central position CL31 of the absorbent-body placement surface 31 in the left-right direction is displaced rightward from the central position CL10 of the main body 10. In the present embodiment, the central position CL31 of the absorbent-body placement surface 31 in the left-right direction and the central position CL11a of the urine passage portion 11a in the left-right direction are substantially the same (see FIGS. 4 and 5). As illustrated in FIG. 5, the absorbent-body placement surface 31 has an area that is larger than the area of the urine passage portion 11a. Thus, excrement that has passed through the urine passage portion 11a and dropped onto the absorbent-body placement surface 31 does not leak to the outside of the absorbent-body placement surface 31 and is absorbed by the absorbent body 200.

The first end region Ra and the second end region Rb are regions between which the central region Rc is interposed in the front-back direction, and are regions at end portions of the tray 30 in the front-back direction. The first end region Ra and the second end region Rb are symmetric (configured identically) in the front-back direction, except for an identification mark 34 (corresponding to an identification portion). Thus, the tray 30 is capable of being housed in the lower case 12 with the orientation thereof in the front-back direction reversed. The identification mark 34 is disposed in a part other than the absorbent-body placement surface 31. This is because, if the identification mark 34 were disposed on the absorbent-body placement surface 31, the identification mark 34 would be hidden by the absorbent body 200. The specific position and configuration of the identification mark 34 will be described below. Parts of the first end region Ra and the second end region Rb having the same configuration are denoted by the same numerals. Hereafter, mainly, the configuration of the first end region Ra will be described.

The first end region Ra is a region on the front side relative to the absorbent-body placement surface 31 in the state illustrated in FIG. 5 (forward orientation). However, It is also possible to place the first end region Ra on the back side relative to the absorbent-body placement surface 31 (backward orientation) by reversing the orientation of the tray 30 in the front-back direction. A handle 32, a storing portion 33, and the identification mark 34a (corresponding to a first identification portion) are disposed in the first end region Ra.

The handle 32 is a portion that a user grasps when pulling out the tray 30 from the lower case 12 (the main body 10) or inserting the tray 30 into the lower case 12. The handle 32 is disposed in the first end region Ra at an end opposite from the absorbent-body placement surface 31 (an end of the tray 30 in the front-back direction). As illustrated in FIG. 7, the cross-sectional shape of the handle 32 according to the present embodiment is L-shaped. However, the cross-sectional shape is not limited to this, and may be another shape such as a rectangle.

The storing portions 33, which are a pair of portions that are recessed downward in the first end region Ra, are disposed on both sides of the first end region Ra in the left-right direction. The storing portions 33 can store an aromatic agent, a deodorant, or the like.

The identification mark 34a is a mark for identifying one side and the other side of the tray 30 in the front-back direction. The identification mark 34a according to the present embodiment is shaped like the head of a cat.

As illustrated in FIG. 6, the identification mark 34a is disposed on the upper surface of the tray 30. Thus, visibility is improved, and a user, such as an owner of an animal, can easily notice the identification mark 34a when pulling out the tray 30.

The identification mark 34a is disposed in the first end region Ra. Thus, a user can quickly notice the identification mark 34a when pulling out the tray 30. To be more specific, the identification mark 34a is disposed between the handle 32 and the absorbent-body placement surface 31. Thus, when a user grasps the handle 32, the identification mark 34a is not hidden by the hand of the user, and the user can easily notice the identification mark 34a. Moreover, the user can notice the identification mark 34a before the absorbent body 200 becomes exposed, when pulling out the tray 30. That is, the user can identify the orientation of the tray 30 in the front-back direction without exposing the absorbent body 200. With such an arrangement described above, when the tray 30 is housed in the lower case 12 (the main body 10), the identification mark 34a is hidden in the lower case 12 (see FIG. 5). That is, the identification mark 34a is disposed at a position that is not visible from the outside in a state in which the tray 30 is housed in the lower case 12 (the main body 10). Thus, during normal use, the identification mark 34a is not visible and does not affect the appearance of the animal litter box 1.

As illustrated in FIG. 7, the identification mark 34a is a protruding portion that protrudes above the surrounding area. The protruding height of the identification mark 34a is substantially the same as the height of the handle 32. If the height of the identification mark 34a were higher than the height of the handle 32, the identification mark 34a might contact the lower case 12 or cause obstruction when a user pulls out the tray 30 from the lower case 12 or inserts the tray 30 into the lower case 12. In contrast, by making the height of the identification mark 34a smaller than or equal to the height of the handle 32, the identification mark 34a does not cause obstruction when a user stores (inserts) the tray 30 into the lower case 12 or pulls out the tray 30 from the lower case 12.

As illustrated in FIG. 7, a portion having a height smaller than the height of each of the handle 32 and the identification mark 34a is present between the handle 32 and the identification mark 34a. With this portion, the identification mark 34a can be made conspicuous.

In particular, in the present embodiment, the identification mark 34a is disposed at a position that is between the storing portions 33, which are on both sides thereof in the left-right direction and are recessed downward, and that is higher than the bottom surfaces of the storing portions 33. Thus, the identification mark 34a is more conspicuous. Although the identification mark 34a is disposed at the center of the tray 30 in the left-right direction in the present embodiment, the identification mark 34a may be displaced leftward or rightward. However, it is preferable that the identification mark 34a be disposed within an area of the tray 30 in the left-right direction, the area corresponding to the width of the urine passage portion 11a in the left-right direction. Moreover, it is preferable that the identification mark 34a be located at a position such that the identification mark 34a passes under the recessed portion 12k of the lower case 12 when a user pulls out the tray 30. The reason for this will be described below.

In the second end region Rb, the identification mark 34b (corresponding to a second identification portion) is disposed as the identification mark 34. The identification mark 34b, which is a protruding portion similar to the identification mark 34a, is disposed at a position in the second end region Rb that corresponds to the position of the identification mark 34a in the first end region Ra. As illustrated in FIG. 6, the shape of the identification mark 34b is different from the shape of the identification mark 34a. To be specific, while the identification mark 34a is shaped like the head of a cat, the identification mark 34b is shaped like the sole of a foot of a cat (paw pad). The shape of the identification mark 34b is not limited to a paw pad and may be any appropriate shape that is different from the shape of the identification mark 34a. For example, because the shape of the identification mark 34a is a part of the upper body of a cat (head), a user can easily recognize the orientation of the tray if the shape of the identification mark 34b is a part of the lower body of a cat (for example, the tail). In the present embodiment, because the external shape of the recessed portion 12k of the lower case 12 and the shape of the identification mark 34a are substantially similar to each other (the head of a cat), a user can more easily recognize the orientation of the tray 30 if the shape of the identification mark 34b differs from the shape of the identification mark 34a.

Also in the second end region Rb, a pair of storing portions 33 are disposed on both sides in the left-right direction. Thus, it is possible to use the storing portions 33 as assistance for identification by storing an aromatic agent, a deodorant, or the like in the storing portions 33 of only one of the first end region Ra and the second end region Rb, or by storing aromatic agents, deodorants, or the like of different types or colors in the first end region Ra and the second end region Rb.

Identification of Orientation of Tray 30

Figure 8:
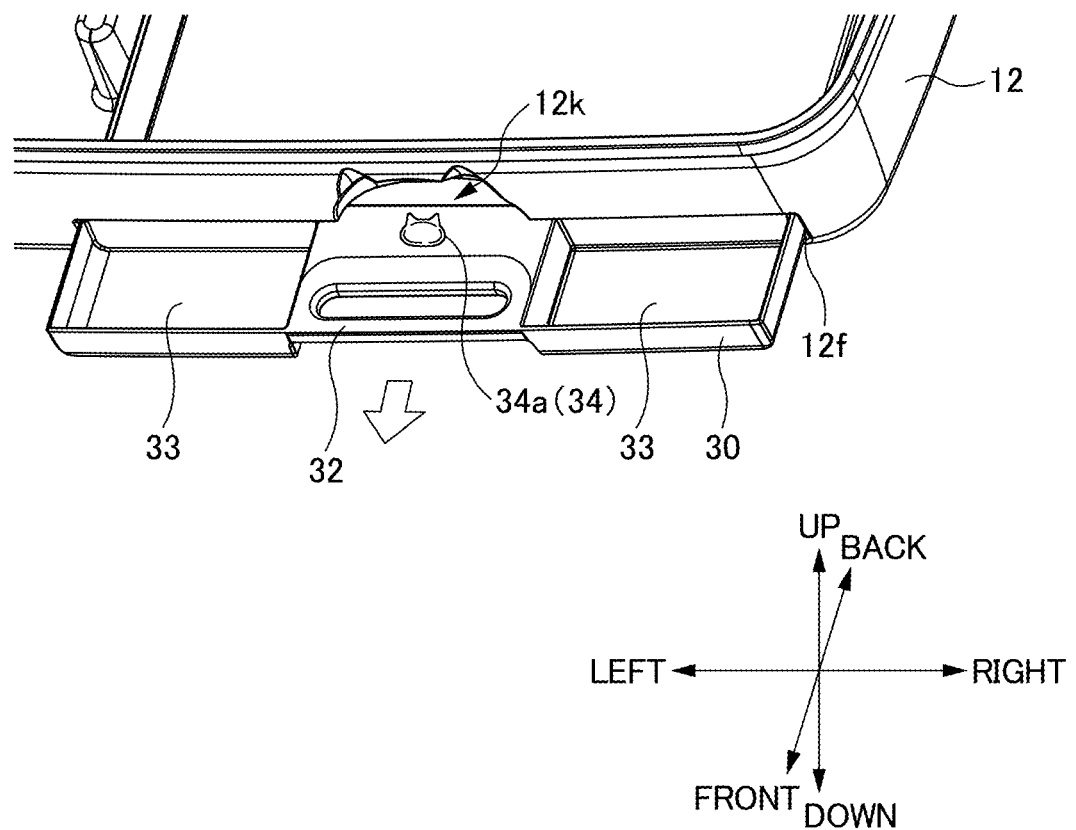
FIG. 8 illustrates a state in which the tray 30 is being pulled out.

FIG. 8 illustrates an example of a state in which the tray 30 is being pulled out.

As described above, the identification mark 34a and the identification mark 34b are each disposed between the handle 32 and the absorbent-body placement surface 31, and are not visible from the outside when the tray 30 is housed in the lower case 12. Therefore, in a state in which the tray 30 is housed in the lower case 12 (the main body 10), it is not possible to identify whether the orientation of the tray 30 is the forward orientation or the backward orientation.

When a user grasps the handle 32 of the tray 30 and pulls the tray 30 forward, the tray 30 moves forward, and the identification mark 34 passes below the recessed portion 12k as illustrated in FIG. 8. The user can identify the orientation of the tray 30 in accordance with whether the identification mark 34 that is visible at this time is the identification mark 34a or the identification mark 34b. For example, in FIG. 8, the user can recognize that the tray 30 is in the forward orientation because the identification mark 34a is visible. If the identification mark 34b is visible, the user recognizes that the tray 30 is in the backward orientation.

Because the recessed portion 12k of the lower case 12 is recessed backward, the identification mark 34 (the identification mark 34a or the identification mark 34b) becomes exposed at an early timing, compared with a case where the front surface is flush. Thus, identification can be performed more quickly.

Moreover, a user can more clearly perform identification by comparing the recessed portion 12k of the lower case 12 with the identification mark 34. That is, because the recessed portion 12k is shaped like the head of a cat when seen from the front (see FIG. 2), the similarity between the recessed portion 12k and the identification mark 34a is higher than the similarity between the recessed portion 12k and the identification mark 34b (in the present embodiment, the recessed portion 12k and the identification mark 34a are substantially similar to each other). Thus, when the user pulls out the tray 30 slightly and if the identification mark 34a, which is similar in external shape to the recessed portion 12k, is visible, the user can recognize that the lower case 12 and the orientation of the tray 30 match (the tray 30 is in the forward orientation). On the other hand, if the identification mark 34b, which is different in external shape from the recessed portion 12k, the user can recognize that the lower case 12 and the orientation of the tray 30 do not match (the tray 30 is in the backward orientation). Thus, for example, even if the user forgets about which of the identification marks 34a and 34b corresponds to the front or the back, the user can accurately identify the orientation, and the accuracy of identification can be increased.

As described above, the recessed portion 12k of the lower case 12 according to the present embodiment has a function of speeding up identification and a function of increasing the accuracy of identification. However, this is not a limitation, and the recessed portion 12k may only be recessed backward (need not have an external shape similar to the identification mark 34). Also in this case, it is possible to speed up identification. In this case, an identification mark on the body side (housing-side identification portion) may be independently disposed at an appropriate position on the front surface of the main body 10.

Positional Relationship with Cutout 25

Next, the arrangement of the cutout 25 (access opening) and the identification mark 34 of the animal litter box 1 will be described.

As illustrated in FIG. 4, in the animal litter box 1, the central position CL31 of the absorbent-body placement surface 31 is displaced rightward in the left-right direction relative to the central position CL10 of the main body 10. Therefore, the tray 30 (in other words, the insertion opening 12f) is disposed so as to be displaced rightward in the left-right direction relative to the central position CL10 (see FIG. 2). The handle 32 is positioned on the right side relative to the central position CL10.

In contrast, as illustrated in FIG. 2, the cutout 25 (access opening) is disposed so as to be displaced leftward relative to the central position CL10. That is, in the animal litter box 1, the cutout 25 and the tray 30 (the absorbent-body placement surface 31) are disposed on the opposite sides in the left-right direction. As illustrated in FIG. 2, the handle 32 and the cutout 25 do not overlap in the left-right direction. Because the identification mark 34 (the identification mark 34a or 34b) is disposed between the handle 32 and the absorbent-body placement surface 31, the identification mark 34 and the cutout 25 do not overlap in the left-right direction.

Thus, for example, even if an animal such as a cat tries to enter the animal litter box 1 through the cutout 25 when a user is pulling out the tray 30, the field of vision of the user is not obstructed by the animal.

As heretofore described, the animal litter box 1 according to the present embodiment includes: the main body 10 including the urine passage portion 11a and the insertion opening 12f that is formed in the front surface thereof, the urine passage portion 11a having the plurality of holes h that allow urine to pass therethrough downward; and the tray 30 that has the absorbent-body placement surface 31 on which the absorbent body 200 for absorbing urine that has passed through the holes h is placed, the tray 30 being housed in the main body 10 from the insertion opening 12f in such a way that the tray 30 is capable of being pulled out forward. The tray 30 is capable of being housed in the main body 10 with the orientation thereof in the front-back direction reversed, and the tray 30 includes the identification mark 34 (the identification mark 34a or 34b), for identifying one side and the other side in the front-back direction, in a part thereof other than the absorbent-body placement surface 31.

With this configuration, a user can easily identify the orientation of the tray 30 in the front-back direction by only slightly pulling out the tray 30. Thus, the user can easily recognize whether it is necessary to reverse the tray 30 or to replace the absorbent body 200, and it is possible to suppress unnecessary reversing and replacement.

In the present embodiment, an excrement treatment substance, which is a granular substance such as cat litter, is placed on the urine passage portion 11a. However, this is not a limitation. By disposing the identification mark 34 in an area of the tray 30 in the left-right direction, the area corresponding to the width of the urine passage portion 11a in the left-right direction, when the amount of the excrement treatment substance is small or when the excrement treatment substance is not placed, a user can visually recognize the identification mark 34 via the holes h of the urine passage portion 11a by slightly pulling out the tray 30.

In the present embodiment, the identification mark 34a and the identification mark 34b each have a shape that represents a part of the body of a cat. However, this is not a limitation. For example, the marks may be other figures, symbols, characters, or numerals. When one of the marks has close similarity to an identification portion on the main body 10 side (in the present embodiment, the recessed portion 12k) (for example, a similar external shape, the same numeral or character, a similar color, a related shape, or the like), a user can easily identify the orientation of the tray.

In the present embodiment, the identification mark 34 (the identification mark 34a or 34b) is a protruding portion. However, the identification mark 34 may be a recessed portion. The identification mark 34 may be a portion other than a protruding portion or a recessed portion. For example, the identification mark 34 may be an affixed seal, a printed portion, or may be a portion where the color has been changed. Also in such a case, a user can easily identify the orientation in the front-back direction.

Second Embodiment

In the embodiment described above, the identification portion (the identification mark 34a or 34b) is disposed on the upper surface of the tray. In the second embodiment, the identification portion is disposed on the lower surface of the tray. That is, on the upper surface side of the tray, the tray is symmetrical both in the front-back direction and in the left-right direction.

Figure 9:
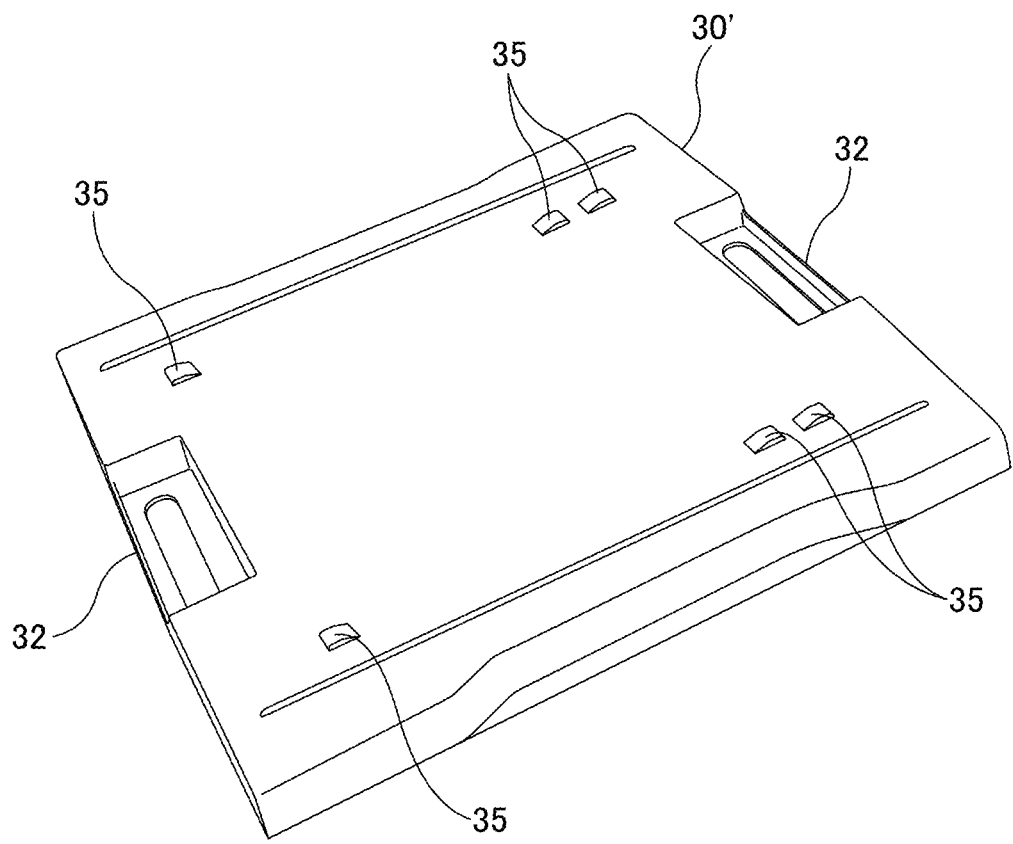
FIG. 9 is a schematic perspective view illustrating the bottom side of a tray 30' according to a second embodiment.
Figure 10:
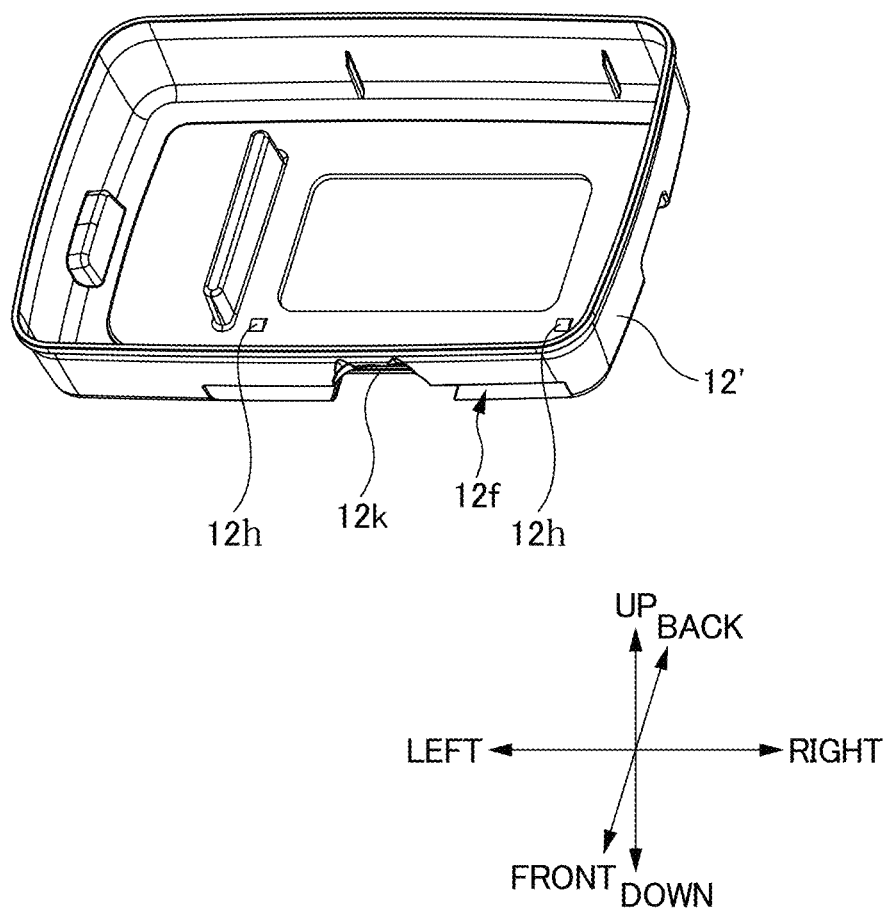
FIG. 10 is a schematic perspective view of a lower case 12' according to the second embodiment.

FIG. 9 is a schematic perspective view illustrating the bottom side of a tray 30' according to a second embodiment, and FIG. 10 is a schematic perspective view of a lower case 12' according to the second embodiment. Portions having configurations that are the same as those of the first embodiment will be denoted by the same numerals and descriptions of such portions will be omitted.

In the second embodiment, as illustrated in FIG. 10, projections 12h protrude upward from the upper surface of the lower case 12' (a surface facing the lower surface of the tray 30'). The projections 12h are a pair of projections that are arranged in the left-right direction on the front side relative to the center of the lower case 12 in the front-back direction (a side closer to the insertion opening 12f). The cross-sectional shape of each of the projections 12h in the front-back direction is substantially triangular, and the slope of a surface of the projection 12h on the back side in the front-back direction is steeper than the slope of a surface of the projection 12h on the front side (see FIG. 11).

As illustrated in FIG. 9, protruding portions 35 that protrude downward are disposed on the lower surface of the tray 30'.

The protruding portions 35, which protrude downward on the lower surface of the tray 30' are disposed at a pair of left and right positions that are determined so that the protruding portions 35 collide with the pair of left and right projections 12h of the lower case 12 when the tray 30' is being pulled out. The protruding portions 35 are disposed on each of one side and the other side in the front-back direction. As illustrated in FIG. 9, the number of the protruding portions 35 differ between one side and the other side in the front-back direction. That is, one protruding portion 35 is disposed on the one side (here, the front side: a side that is positioned at the front when the tray 30' is housed in the forward orientation), and two protruding portions 35 are disposed on the other side (here, the back side: a side that is positioned at the front when the tray 30' is housed in the backward orientation).

Each of the protruding portions 35 has a shape such that the slope of an inside part thereof is gentle and the slope of an outside part is steep, with respect to the center of the tray 30' in the front-back direction. That is, the orientation of each of the protruding portions 35 also differs between the front side and the back side of the tray 30' in the front-back direction.

When the tray 30' is inserted into the insertion opening 12f of the lower case 12' (is housed in the lower case 12'), the protruding portions 35' are inserted into the lower case 12'. Thus, also in the second embodiment, the protruding portions 35' are not visible from the outside and do not affect the appearance.

FIGS. 11A to 11D are schematic sectional views illustrating an identification operation according to the second embodiment. Here, a region near the projection 12h when the tray 30' is slightly pulled out from the state in which the tray 30' is housed in the forward orientation is illustrated.

As illustrated in FIG. 11A, in a state in which the tray 30' is housed in the lower case 12', there is a gap between the protruding portion 35 of the tray 30' and the projection 12h of the lower case 12'.

As illustrated in FIG. 11B, when the tray 30' is slightly pulled out forward, the protruding portion 35 of the tray 30' collides with the projection 12h of the lower case 12', and the collision makes a sound.

When the tray 30' is further pulled out forward, the protruding portion 35 of the tray 30' moves over the projection 12h of the lower case 12', and, as illustrated in FIG. 11C, the protruding portion 35 slides down to the front of the projection 12h of the lower case 12' (in reality, this also makes a sound). Then, as illustrated in FIG. 11D, the tray 30' is further pulled out forward.

In contrast, in a case where the tray 30' is housed in the backward orientation, when a user pulls out the tray 30 slightly, the two protruding portions 35 on the back side collide with the projection 12h and move over the projection 12h. That is, the number of times the protruding portions 35 collide with the projection 12h is twice that of the case of the forward orientation. Therefore, the number of times a sound is made when a user slightly pulls out the tray 30 is larger than that of the case of the forward orientation.

Thus, a user can identify the orientation of the tray 30' from the number of times a sound is made when the user pulls out the tray 30' or from the tactile sensation transmitted to the hand due to the collision.

In the present embodiment, the projections 12h are disposed on the front side relative to the center of the lower case 12 in the front-back direction. However, this is not a limitation, and the projections 12h may be disposed on the back side relative to the center in the front-back direction. Then, the projections 12h and the protruding portions 35 of the tray 30' may collide at positions on the back side relative to the center. In this case, however, the numbers of the protruding portions 35 on one side and the other side of the tray 30' in the front-back direction (the number of the protruding portions 35 on the front side and the number of the protruding portions 35 on the back side) are the reverse of those of the embodiment described above.

In the present embodiment, the lower case 12 has the pair of left and right projections 12h. However, it is not necessary that the number of the projections 12h be two. For example, only one projection 12h may be disposed at the center in the left-right direction of a portion that faces the tray 30'. In this case, the protruding portion 35 of the tray 30' may be disposed only at the center in the left-right direction.

The projection 12h may be omitted. For example, a user may identify the orientation by pulling out the tray 30' slightly and touching the lower surface of the tray 30' by hand. In this case, the user can identify the orientation by using a recessed portion instead of the protruding portion 35.

Other Embodiments

Although the embodiments of the present disclosure have been described hereinabove, the above embodiments of the present disclosure are simply to facilitate understanding of the present disclosure and are not in any way to be construed as limiting the present disclosure. The present disclosure may variously be changed or altered without departing from its gist and encompass equivalents thereof. For example, modification which will be described below is possible.

In the embodiment described above, the upper case 11 and the lower case 12 of the main body 10 of the animal litter box 1 are independently formed. However, these may be integrally formed. The cover 20 and the main body 10 may be integrally formed.

In the embodiment described above, the identification portion (the identification mark 34 or the protruding portion 35) is disposed at a position that is not visible from the outside. However, this is not a limitation, and the identification portion may be disposed at a visible position.

For example, the identification portion may be disposed on an end surface of the tray 30 in the front-back direction (the front surface or the back surface). In this case, a user can identify the orientation of the tray 30 without pulling out the tray 30.

Alternatively, the identification portion may be disposed in the handle 32. In this case, a user can easily notice the identification portion when the user tries to grasp the handle 32 and can identify the orientation without pulling out the tray.

In the embodiment described above, the identification portions are disposed respectively on one side and the other side of the tray 30 in the front-back direction. However, the identification portion may be disposed on only one side of the tray 30 in the front-back direction. Also in this case, a user can identify the forward and backward orientations from the presence/absence of the identification portion.

The invention claimed is:

1. An animal litter box having a front-back direction, a left-right direction, and an up-down direction that are orthogonal to each other, the animal litter box comprising:
   a tray housing including a urine passage portion and an insertion opening,
      the urine passage portion having a plurality of holes through which urine pass downward,
      the insertion opening that is formed in a front surface of the tray housing; and
   a tray including an absorbent-body placement surface on which an absorbent body for absorbing urine that has passed through the holes is placed,
      the tray being housed in the tray housing from the insertion opening in such a way that the tray is capable of being pulled out forward,
      the tray being capable of being housed in the tray housing with an orientation of the tray in the front-back direction reversed,
   wherein
   the tray includes an identification portion in a part of the tray other than the absorbent-body placement surface,
      the identification portion being for identifying one side and an other side in the front-back direction,
   the tray has end regions on both sides in the front-back direction between which the absorbent-body placement surface is interposed,
   the identification portion includes a protruding portion protruding upward in the up-down direction and disposed in each of the end regions,
   each of the end regions of the tray includes a handle,
   a protruding height of the identification portion is smaller than or equal to a height of the handle, and
   a portion having a height smaller than the height of the handle and the protruding height of the identification portion is present between the handle and the identification portion.

2. The animal litter box according to claim 1, wherein the identification portion is disposed at a position that is not visible from outside in a state where the tray is housed in the tray housing.

3. The animal litter box according to claim 1, wherein the identification portion is disposed on an upper surface of the tray.

4. The animal litter box according to claim 3, wherein the identification portion is disposed within an area of the tray in the left-right direction,
   the area corresponding to a width of the urine passage portion in the left-right direction.

5. The animal litter box according to claim 1, wherein the identification portion is disposed between the handle and the absorbent-body placement surface.

6. The animal litter box according to claim 1, wherein an overhead portion that is directly above the insertion opening of the tray housing is recessed backward, and
   the identification portion passes below the overhead portion when the tray is being pulled out.

7. The animal litter box according to claim 6, wherein an external shape of the overhead portion when seen from front corresponds to and has a size different from an external shape of the identification portion.

8. The animal litter box according to claim 1, wherein the tray further includes
   a first identification portion on the one side in the front-back direction, and
   a second identification portion on the other side in the front-back direction, the second identification portion being different from the first identification portion,
   the tray housing includes a housing-side identification portion on the front surface, and
   the housing-side identification portion has a shape corresponding to a shape of one of the first identification portion and the second identification portion.

9. The animal litter box according to claim 8, wherein the shape of the first identification portion represents a part of an upper body of an animal,
   the shape of e second identification portion represents a part of a lower body of the animal, and
   the shape of the housing-side identification portion represents either the part of the upper body or the part of the lower body.

10. The animal litter box according to claim 1, wherein the animal litter box comprises an access opening for an animal, in the front surface above the urine passage portion,
   the access opening is disposed so as to be displaced toward one side in the left-right direction relative to a left-right-direction central position of the tray housing,
   the insertion opening is disposed so as to be displaced toward another side in the left-right direction relative to the left-right-direction central position, and
   the identification portion does not overlap the access opening in the left-right direction.

11. The animal litter box according to claim 1, wherein the tray includes a pair of storing portions on both sides in the left-right direction, the pair of storing portions being recessed downward, and
the identification portion is disposed at a position that is between the pair of storing portions and that is higher than bottom surfaces of the pair of storing portions.

12. The animal litter box according to claim 1, wherein the tray includes a further identification portion including a further protruding portion or a recessed portion, and
the further protruding portion or the recessed portion is formed on or in a lower surface of the tray.

13. The animal litter box according to claim 1, wherein a projection that projects upward is formed on a surface of the tray housing facing a lower surface of the tray,
the tray includes a further identification portion including, on each of the one side in the front-back direction and the other side in the front-back direction of the lower surface, protruding portions colliding with the projection when the tray is being pulled out, and
a number of the protruding portions on the one side in the front-back direction differs from a number of the protruding portions on the other side in the front-back direction.

14. The animal litter box according to claim 1, wherein the tray includes a further identification portion disposed at a position that is visible from outside in a state where the tray is housed in the tray housing.

15. The animal litter box according to claim 14, wherein the tray includes a further identification portion formed in the handle.

16. An animal litter box having a front-back direction, a left-right direction, and an up-down direction that are orthogonal to each other, the animal litter box comprising:
a tray housing including a urine passage portion and an insertion opening,
the urine passage portion having a plurality of holes through which urine pass downward,
the insertion opening that is formed in a front surface of the tray housing; and
a tray including an absorbent-body placement surface on which an absorbent body for absorbing urine that has passed through the holes is placed,
the tray being housed in the tray housing from the insertion opening in such way that the tray is capable of being pulled out forward,
the tray being capable of being housed in the tray housing with an orientation of the tray in the front-back direction reversed,
wherein
the tray includes an identification portion in a part of the tray other than the absorbent-body placement surface, the identification portion being for identifying one side and an other side in the front-back direction,
the tray has end regions on both sides in the front-back direction between which the absorbent-body placement surface is interposed, each of the end regions including a handle,
the identification portion is disposed in each of the end regions,
the identification portion is a protruding portion,
a protruding height of the identification portion is smaller than or equal to a height of the handle, and
a portion having a height smaller than the height of the handle and the protruding height of the identification portion is present between the handle and the identification portion.

* * * * *